(12) United States Patent
Hu et al.

(10) Patent No.: US 9,537,757 B2
(45) Date of Patent: Jan. 3, 2017

(54) ADDING LINK AGGREGATION GROUP TO HITLESS PROTECTION IN PACKET SWITCHED NETWORKS

(71) Applicant: NEC Laboratories America, Inc., Princeton, NJ (US)

(72) Inventors: Junqiang Hu, Princeton, NJ (US); Yoshinobu Ooto, Tokyo (JP); Kazuo Takagi, Tokyo (JP); Yoshiaki Aono, Tokyo (JP); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 29 days.

(21) Appl. No.: 14/454,957

(22) Filed: Aug. 8, 2014

(65) Prior Publication Data

US 2015/0043331 A1 Feb. 12, 2015

Related U.S. Application Data

(60) Provisional application No. 61/864,737, filed on Aug. 12, 2013.

(51) Int. Cl.

| H04L 12/707 | (2013.01) |
|---|---|
| H04L 12/735 | (2013.01) |
| H04L 12/709 | (2013.01) |
| H04L 12/703 | (2013.01) |
| H04L 12/801 | (2013.01) |

(52) U.S. Cl.
CPC .......... *H04L 45/22* (2013.01); *H04L 45/1283* (2013.01); *H04L 45/245* (2013.01); *H04L 45/28* (2013.01); *H04L 47/34* (2013.01); *Y02B 60/33* (2013.01)

(58) Field of Classification Search
CPC .................. H04L 12/00–12/955; H04L 45/22; H04L 45/28; H04L 47/34
See application file for complete search history.

(56) References Cited

U.S. PATENT DOCUMENTS

| 7,697,525 | B2* | 4/2010 | Zelig | H04L 45/00 370/230.1 |
|---|---|---|---|---|
| 8,144,711 | B1* | 3/2012 | Pegrum | H04L 12/4641 370/218 |
| 2008/0074996 | A1* | 3/2008 | Fourcand | H04L 1/0086 370/225 |

(Continued)

*Primary Examiner* — Ian N. Moore
*Assistant Examiner* — Lakeram Jangbahadur
(74) *Attorney, Agent, or Firm* — Joseph Kolodka

(57) ABSTRACT

A method is provided for traffic aggregation in a hitless protected packet switched network having source and destination nodes. The method includes enabling a working path and a protecting path between the source and destination nodes. The working path is non-overlapping with respect to the protecting path. The method includes generating, using a processor, internal marker packets at working and protecting input ports of the source nodes. Each market packet represents a respective marker time period. The method includes transmitting the marker packets to working and protecting output ports of the source nodes, by the working and protecting input ports of the source nodes. The method includes selectively aggregating, at each of the working and protecting output ports of the source nodes, hitless traffic sent from different working and protecting inputs ports of the source nodes to provide an aggregated flow there from, responsive to the marker packets.

5 Claims, 4 Drawing Sheets

(56) References Cited

U.S. PATENT DOCUMENTS

2012/0113835 A1* 5/2012 Alon .................. H04L 43/0817
370/252
2014/0211621 A1* 7/2014 Sundaram ............... H04L 47/41
370/231

* cited by examiner

ADDING LINK AGGREGATION GROUP TO HITLESS PROTECTION IN PACKET SWITCHED NETWORKS

RELATED APPLICATION INFORMATION

This application claims priority to provisional application Ser. No. 61/864,737 filed on Jul. 27, 2013, incorporated herein by reference.

BACKGROUND

Technical Field

The present invention relates to signal processing, and more particularly to adding a link aggregation group to hitless protection in packet switched networks.

Description of the Related Art

Hitless protection plays an important role in packet switched networks in order to provide a carrier grade time division multiplexing (TDM) service. Hitless protection is a protection switching scheme that guarantees no traffic loss when a failure occurs. It is achieved through 1+1 network protection using source node replication plus destination node hitless traffic selection. The two copies of traffic are sent from the same source node, pass through non-overlapped network paths (called the working and the protecting path, respectively), and arrive at the same destination node.

However, the use of hitless protection is not without deficiencies and, thus, other supplemental methods are also desired to further increase failure resistance in packet switched networks.

SUMMARY

These and other drawbacks and disadvantages of the prior art are addressed by the present principles, which are directed to adding a link aggregation group to hitless protection in packet switched networks.

According to an aspect of the present principles, a method is provided for traffic aggregation in a hitless protected packet switched network having source and destination nodes. The method includes enabling a working path and a protecting path between the source and destination nodes. The working path is non-overlapping with respect to the protecting path. The method further includes generating, using a processor, internal marker packets at working and protecting input ports of the source nodes. Each of the internal market packets representing a respective marker time period. The method also includes transmitting the internal marker packets to working and protecting output ports of the source nodes, by the working and protecting input ports of the source nodes. The method additionally includes selectively aggregating, at each of the working and protecting output ports of the source nodes, hitless traffic sent from different ones of the working and protecting inputs ports of the source nodes to provide an aggregated flow there from, responsive to the internal marker packets.

According to another aspect of the present principles, a method is provided. The method is for providing hitless protection in a packet switched network having source and destination nodes. The method includes enabling a working path and a protecting path between the source and destination nodes. The working path is non-overlapping with respect to the protecting path. The method further includes configuring output ports of each of the destination nodes as a respective link aggregation group that includes one or more members. The method also includes determining, using a processor, correctness information for a received hitless traffic flow at input ports of each of the destination nodes. The method additionally includes configurably providing the hitless traffic from different ones of the input ports of the destination nodes in a hitless protection mode responsive to the correctness information. The different ones of the input ports include working path and protecting path input ports.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to adding a link aggregation group to hitless protection in packet switched networks.

In an embodiment, for increased reliability, in addition to hitless protection, link aggregation group (LAG) is also used to connect the client to the core network, or connect two carrier networks, by using multiple links to avoid service interruption during single link failure.

In an embodiment, the present principles support LAG flow aggregation (or in a more general case, flow aggregation) in a source node and flexible traffic distribution (usually by hashing) to LAG members in a destination port. The related problems include outputting the identical flow from working and protecting port in the source node; tolerance of random traffic pattern(s) to support all possible services; tolerance of random switching/queuing/forwarding latency; packet loss; and flexible packet distribution in the destination node.

Various embodiments of the present principles involve a "working path" and a "protecting path". In an embodiment, the term "working path" refers to the path that the receiver chooses the packets from under normal conditions and can be, for example, the path with shorter latency (with respect to the protecting path described hereafter). Moreover, in an embodiment, the term "protecting path" refers to the path that works as backup, in that the packets received from that path are discarded at the receiver in normal conditions and only used when the working path encounters failure or packet loss. However, in another embodiment, the working path and the protecting path are treated equally. The working path and the protecting path are further described herein.

A description will now be given of a network architecture to which the present principles can be applied, in accordance with an embodiment of the present principles.

Figure 1:
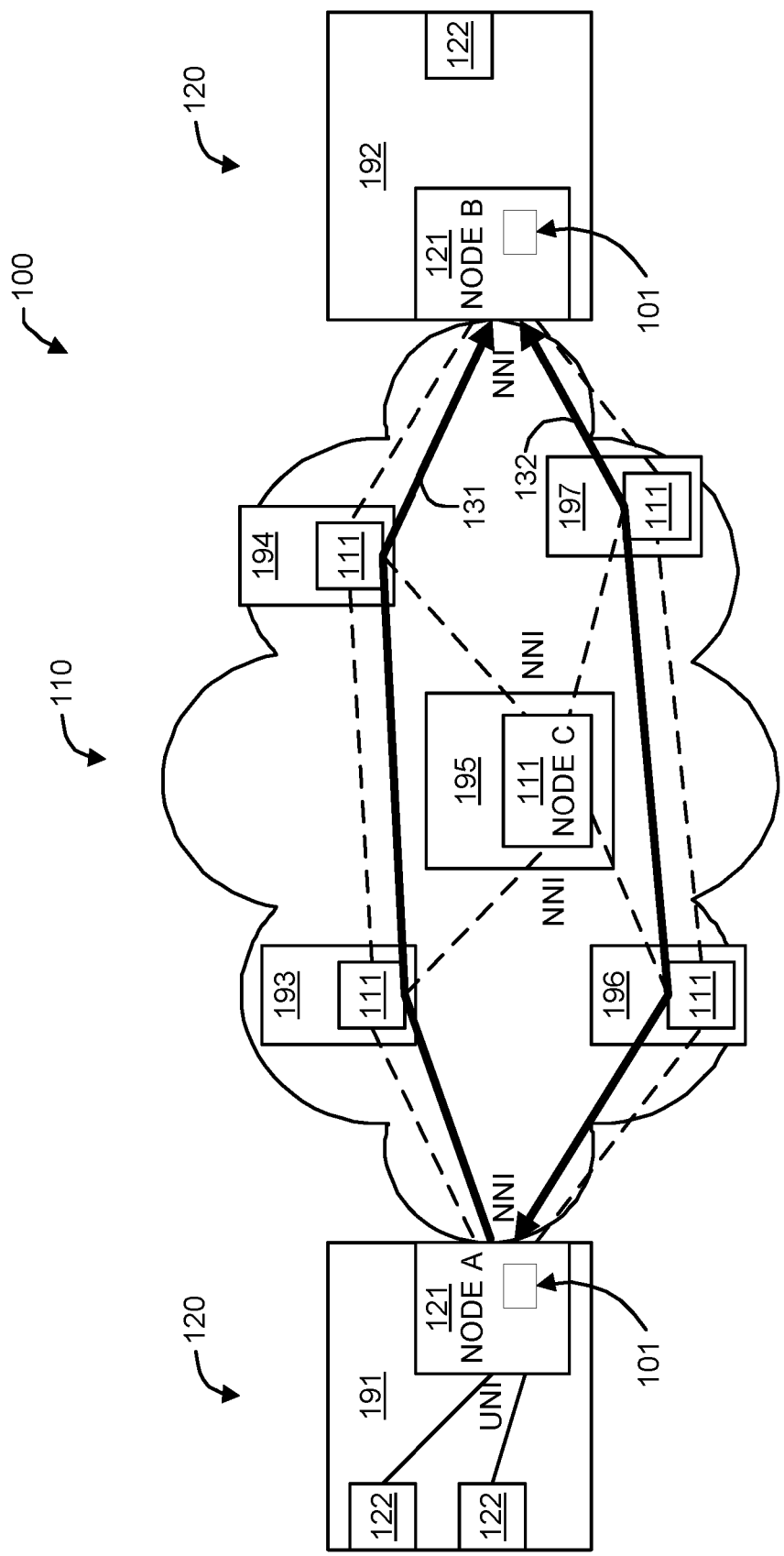
FIG. 1 shows an exemplary packet switched network architecture 100 to which the present principles can be applied, in accordance with an embodiment of the present principles.

FIG. 1 shows an exemplary packet switched network architecture 100 to which the present principles can be applied, in accordance with an embodiment of the present principles. The packet switched network architecture 100 includes a core network 110 and multiple edge networks 120. It is to be appreciated that the terms "edge networks" and "access networks" as used interchangeably herein. The core network 110 includes core nodes 111. The edge networks 120 include edge nodes 121. The edge nodes 121 include edge node A and edge node B. In the embodiment of FIG. 1, each of the nodes 111 and 121 are associated with a respective entity which can be any type of entity. The entities include entities 191 through 197. The edge networks 120 also include client nodes 122. The nodes 111, 121 may include one or more processors 101 configured to perform a plurality of steps of the present principles, including, for example, determining correctness information for a received hitless traffic flow at input ports of one or more destination nodes according to some embodiments.

Systems/networks are classified according to their connected networks. For example, the system connecting the edge network and the core network, or that connects two different carrier networks, is called the edge system/network 120. Moreover, the system connecting the core nodes 111 is called the core system/network 110.

For an edge node 121, the interface connecting the edge network 120 is called a user-network-interface (UNI); the interface connecting to the core network is called a network-network-interface (NNI). Network protection is usually provided from end-to-end (close to customer), or edge to edge. For either case, the network may have one working (primary) path plus a non-overlapped backup one for each traffic flow. These two paths are connected to different ports of a terminating node (e.g., the edge node 121 when the protection is edge to edge).

FIG. 1 shows exemplary traffic paths from edge node A to node B, where the line 131 represents the working path and line 132 for the backup one (protecting path). There are two protecting modes commonly seen: one mode is that only one path has traffic for the given flow; the other mode has duplicated traffic in both working and protecting paths. The former is called 1:1 (or 1:n if one path is used to protect multiple other paths) protection, and the latter is called 1+1 protection.

A description will now be given regarding a link aggregation group (LAG) requirement, in accordance with an embodiment of the present principles.

LAG is logically viewed as a single port. To simplify network management and operation, traffic going to the same destination that includes the same parameters (such as, e.g., priority and total bandwidth) shall be aggregated into a single flow (such as, e.g., for example, a single label switched path (LSP)), regardless which physical port the traffic comes from. In a more general case, multiple source flows from different LAGs can be aggregated into a single destination flow. Such flow aggregation places several challenges on hitless protection as follows: identical flow required for the 1+1 paths; tolerance of random traffic pattern; and LAG hashing.

Regarding identical flow required for the 1+1 paths, we note the following. Here, "identical flow" is up to the capability of the destination node processing. For example, if the destination system processes (in terms of delivering hitless service) in the granularity of a packet, the packet sequence in the two paths shall be exactly the same. However, if the destination system processes in the granularity of a group of packet, then it is acceptable if the working and protecting path have the same packets for each block, regardless of the packet sequence inside each block. Flow aggregation is usually done in the output port, and each output ports usually operates independently. Consider the working and protecting paths connected to different output ports of a system, how to have these two independent ports output an identical flow is the first problem.

Regarding tolerance of a random traffic pattern, we note the following. Unlike time division multiplexing (TDM) switching, packet switching may encounter random and unpredictable traffic patterns. One scenario is for burst traffic, where for a certain time period the source port may detect silence in that flow. In another case, the given traffic flow may have an extremely low bandwidth, which means the interval between each two packets can be very long. For line cards belonging to a certain LAG, due to a client side load balancing mechanism, the arrival port(s) of expected traffic cannot be predicted, so in the worst case one LAG member may encounter silence all the time for the specific hitless flow. These different cases add additional challenges in the output ports.

Regarding LAG hashing, we note the following. When the output port of a flow in the destination node is a LAG with multiple members, a commonly used method is to distribute the traffic in a load balanced way to different members. Such load balancing is usually achieved by a hashing algorithm, through the pre-configured field(s) of the packet header such as, e.g., virtual local area network (VLAN) identifier (ID), source/destination media access control (MAC) address, and IPv4 source/destination Internet Protocol (IP) address. For administrative flexibility, the fields used for hashing shall be flexible, without constraints such as being limited to a layer-2 header. The consequence of such flexibility requirement is that a specific packet flow might be distributed to multiple member links. This adds difficulty to the receiver (egress) side, since each LAG member may operate independently in the output port.

In one embodiment, at a source node A 121, the input port periodically inserts (internal) marker packets into each hitless traffic flow. These marker packets act as the "boundary" of packet groups. These marker packets are treated as the same flow as data packets by the traffic manager (TM), buffered in the same queue, and switched to the output ports in sequence. Output ports use the internal marker packets to aggregate traffic of the same output flow from different LAG members. In more general case, the aggregation happens to traffic from different LAGs but belonging to the same output flow. In each source port, internal markers for different flows are inserted in interleaved mode to avoid congestion. Packets from different LAGs are aggregated by group. That is, traffic from different LAGs that belonging to the same group are aggregated as one output group. External marker packets are used to indicate the boundary of such aggregated group.

As an illustrative example, if H1 and H2 are the source node UNI line cards belonging to the same LAG; H3 and H4 are the source node NNI line cards (destination ports) connecting to the working and protecting paths. Each UNI line card inserts is own internal marker iMj based on its timing and knowledge (for example the number of packets it has in between), and NNI line cards use such internal marker as decision for packets aggregation and external marker insertion. For example, in NNI line card H3, upon detecting internal marker iM2 (regarding marker sequence or timestamp value only) from both H1 and H2, it finishes one aggregation period, fills in the contents of external marker M2, inserts M2 into the packet flow, and then starts the aggregation period for M3.

In one embodiment, in a destination node B 121, the input port checks for the correctness of the received packet group by comparing with the associated marker. The input port replaces the external marker with internal checking result (or called destination node internal marker) which includes generated result and some necessary fields copied from external marker. If the destination is LAG and works in load balanced mode, the internal checking result is replicated to each destination line card (or destination port) belonging to the target LAG; their related data packets are distributed to the LAG members using load-balancing method such as hashing. The replicated marker packets for each destination line card (or destination port) are buffered in the same queue as data packets that are distributed to the same line card (or port), to maintain their relative sequence as received. This is shown in FIG. 3, with illustration of identical traffic inputs from working and protecting paths (path A and B respectively); illustration of marker and data packets forwarding in H5, where marker is multicasted to all the LAG members, and data packet is load-balanced to a single LAG member; and illustration of packets distribution result to all the LAG members (H7 and H8).

In one embodiment, the output of the destination node B 121 is a LAG containing one or more members. The input port of the destination node B 121 checks for the correctness of the received hitless traffic flow; the output port uses the correctness information to achieve hitless protection. In some embodiments, each input port may check the correctness of received data packets by comparing to the associated marker packets, the correctness information is broadcast to each member of the destination LAG; each data packet is sent to only one member of the destination LAG; correctness information and data packets are received at output port of destination node, in the same sequence as in input port, which is also the received sequence; and output port determines packet loss and path status based on checking result; hitless protecting switching is carried out based on the decision according to the present principles.

Figure 2:
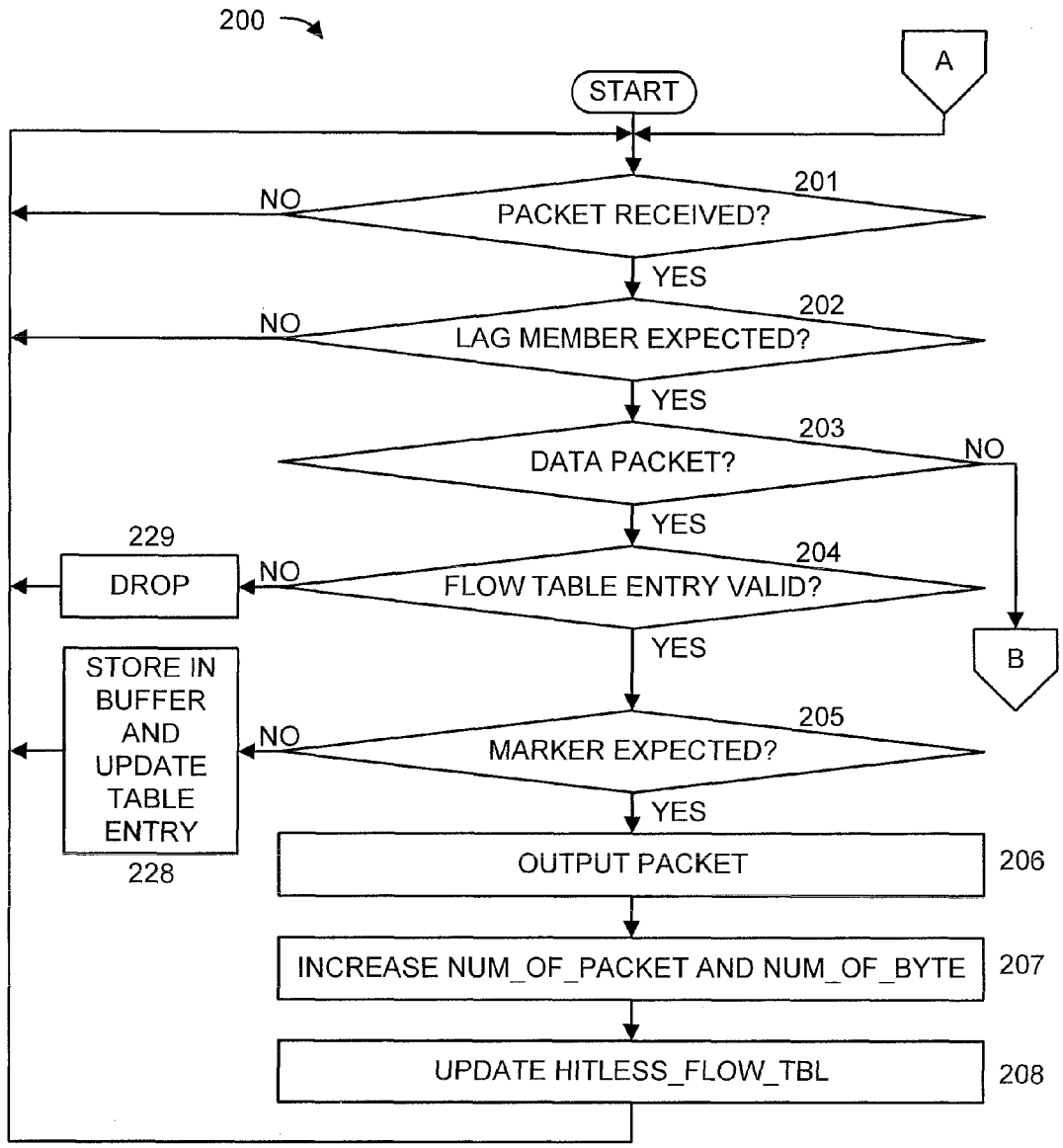
FIGS. 2-4 show an exemplary method 200 for adding a link aggregation group for hitless protection in a packet switched network, in accordance with an embodiment of the present principles.
Figure 3:
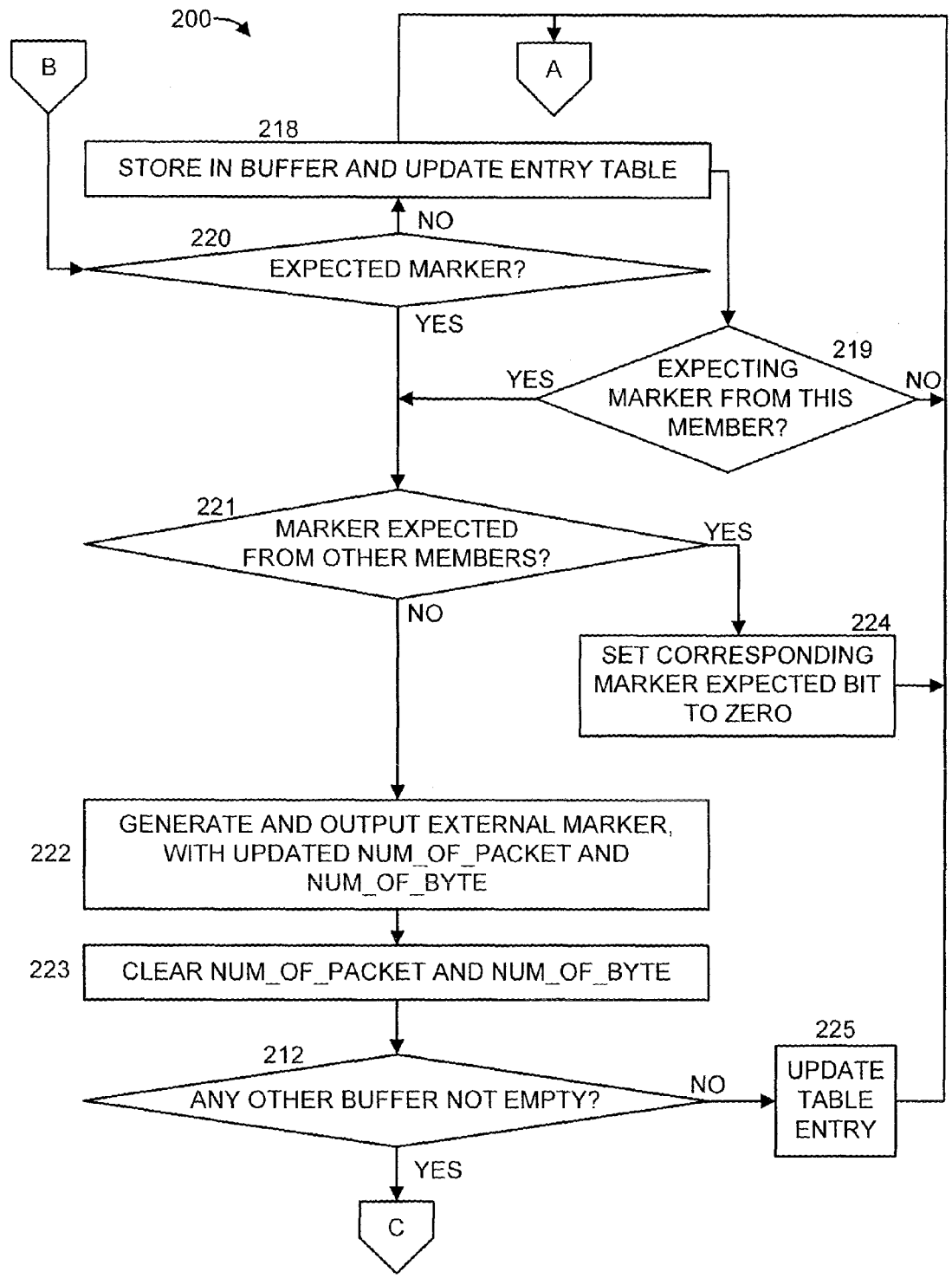
Figure 4:
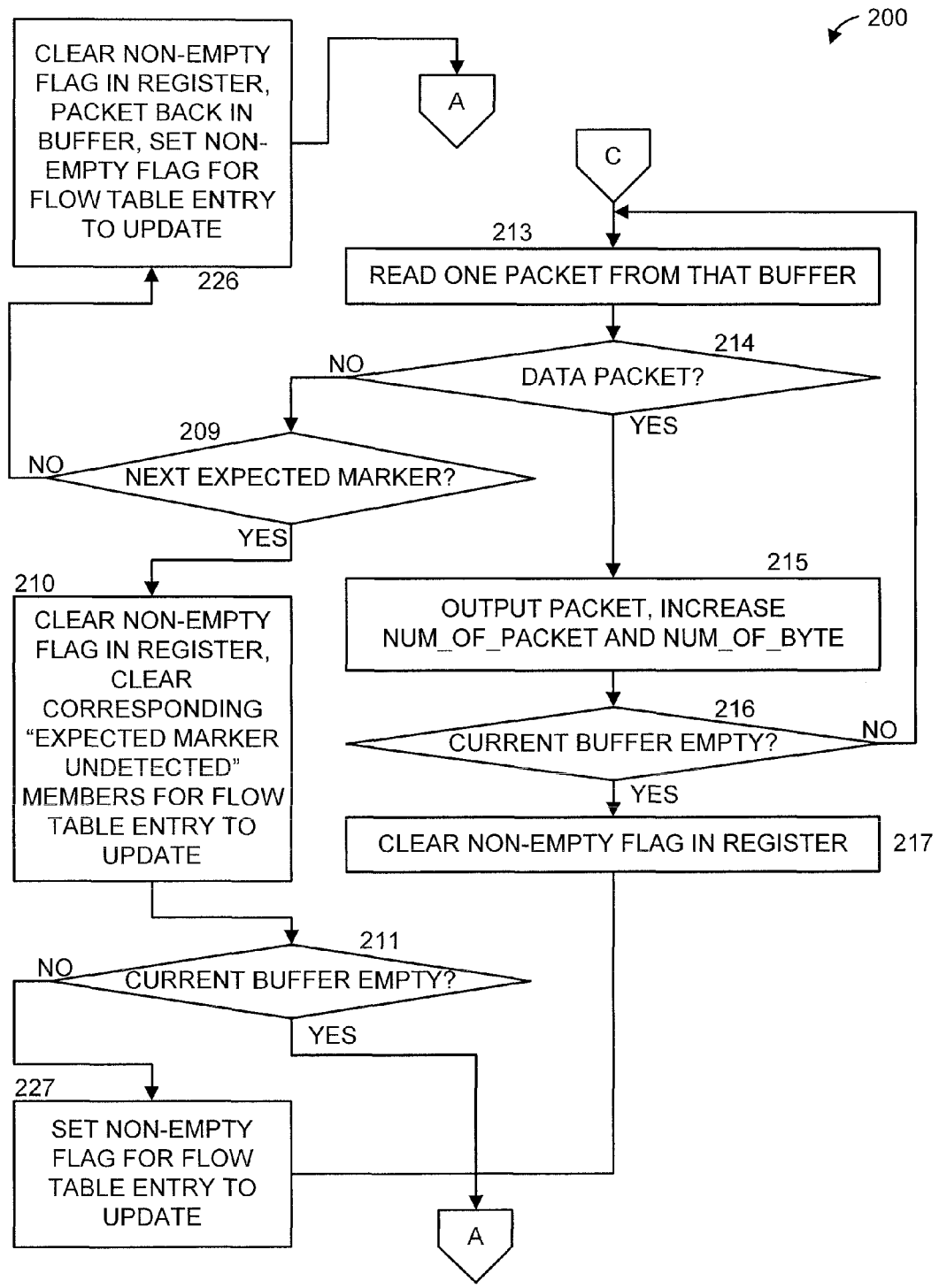

FIGS. 2-4 show an exemplary method 200 for adding a link aggregation group for hitless protection in a packet switched network, in accordance with an embodiment of the present principles. This method is executed in the output ports of the source nodes.

At step 201, it is determined whether or not a packet has been received. If so, then the method proceeds to step 202. Otherwise, the method returns to step 201.

At step 202, it is determined whether or not a LAG member is expected. If so, then the method proceeds to step 203. Otherwise, the method returns to step 201. Further regarding step 202, if the flow table entry indicates that the packet's LAG member does not have corresponding bit set in hitless flow table, it means such flow is not expected from this member so it shall be dropped. The common case for this condition is when a new LAG member is inserted into an existing LAG group, when the UNI is already configured but the NNI configuration has not finished.

At step 203, it is determined whether or not the packet is a data packet. If so, then the method proceeds to step 204. Otherwise, the method proceeds to step 220.

At step 204, it is determined whether or not the flow table entry is valid. If so, then the method proceeds to step 205. Otherwise, the method proceeds to step 229.

At step 205, it is determined whether or not a marker is expected. If so, then the method proceeds to step 206. Otherwise, the method proceeds to step 228. Further regarding step 205, the same is directed to whether a marker is expected from the LAG member from which the current packet was received. If a marker is not expected (i.e., already received) from the current flow, it means the data packet belongs to the next marker slot, so it shall be buffered (as per step 228) instead of outputted.

At step 206, the packet is output, and the method proceeds to step 207.

At step 207, num_of_packet and_num_of_byte are increased, and the method proceeds to step 208.

At step 208, hitless_flow_tbl is updated, and the method returns to step 201.

At step 229, the flow table entry is dropped, and the method returns to step 201.

At step 228, the marker is stored in a buffer, the table entry is updated, and the method returns to step 201.

At step 220, it is determined whether or not the marker is the expected marker. If so, then the method proceeds to step 221. Otherwise, the method proceeds to step 218. Regarding step 220, and whether it is the expected marker, there is a marker expected from this member, and it matches the expected value in the table.

At step 221, it is determined whether or not the marker is expected from other members. If so, then the method proceeds to step 224. Otherwise, the method proceeds to step 222.

At step 224, the corresponding marker expected bit is set to zero, and the method returns to step 201.

At step 222, an external marker is generated and output with the updated num_of_packet and num_of_byte, and the method proceeds to step 223.

At step 223, num_of_packet and num_of_byte are cleared, and the method proceeds to step 212.

At step 212, it is determined whether or not any other buffer is not empty. If so, then the method proceeds to step 213. Otherwise, the method proceeds to step 225.

At step 213, one packet is read from that buffer, and the method proceeds to step 214.

At step 214, it is determined whether or not the packet is a data packet. If so, then the method proceeds to step 215. Otherwise, the method proceeds to step 209.

At step 215, the packet is output, num_of_packet and num_of_byte are increased, and the method proceeds to step 216.

At step 216, it is determined whether or not the current buffer is empty. If so, then the method proceeds to step 217. Otherwise, the method returns to step 213.

At step 217, the non-empty flag in the register is cleared and the method returns to step 212. Further regarding step 217, the same refers to the currently in use table entry.

At step 209, it is determined whether or not the next expected marker has been received. If so, then the method proceeds to step 210. Otherwise, the method proceeds to step 226.

At step 210, the non-empty flag in the register is cleared, corresponding expected_marker_undetected" members are cleared for flow table entry to update, and the method proceeds to step 211.

At step 211, it is determined whether or not the current buffer is empty. If so, then the method returns to step 212. Otherwise, the method proceeds to step 227.

At step 227, the non-empty flag is set for the flow table entry to update, and the method returns to step 212.

At step 226, the non-empty flag in the register is cleared, the packet is back into the buffer, the non-empty flag is set for the flow table entry to update, and the method returns to step 212.

At step 225, the table entry is updated, and the method returns to step 201.

At step 218, the expected marker is stored in a buffer, the table entry is updated, and the method proceeds to step 219.

At step 219, it is determined whether or not a marker is expected from this member. If so, then the method proceeds to step 221. Otherwise, the method returns to step 201.

Further regarding step 210, 226, and 227, two registers can be present in processing logic: "currently in-use table entry"; and "table entry to update". The "currently in-use table entry" register is updated after each buffer reading, while the "table entry to update" register records the necessary information when writing back into the actual table, after packets belonging to current marker period from all buffers have been read out.

Further regarding steps 218 and 219, if it's the marker with a timestamp larger than expected, then the marker will be stored in the buffer. Meanwhile, if there is a marker expected from the current member, that means the marker got lost, so processing will be performed as if the marker was received.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for providing hitless protection in a packet switched network having source and destination nodes, the method comprising:
    enabling a working path and a protecting path between the source and destination nodes, the working path being non-overlapping with respect to the protecting path;
    configuring output ports of each of the destination nodes as a respective link aggregation group that includes one or more members, wherein said configuring step is performed at a link aggregation group level;
    determining, using a processor, correctness information for a received hitless traffic flow at input ports of each of the destination nodes, wherein at least a portion of the correctness information is broadcast to each of the members of the link aggregation group, and each data packet of the traffic flow is switched to one of the members of the link aggregation group;
    configurably providing the hitless traffic from different ones of the input ports of the destination nodes in a hitless protection mode responsive to the correctness information, the different ones of the input ports including working path and protecting path input ports;
    providing the hitless traffic with associated marker packets, each of the marker packets for dividing data packets from the hitless traffic into respective data packet groups;
    wherein at least some of the marker packets specify at least one of, a number of packets and a number of bytes transmitted after a previous one of the marker packets;
    wherein the correctness information indicates whether the at least one of, the number of packets and the number of bytes transmitted after the previous one of the marker packets, is consistent with that indicated by a corresponding one of the marker packets.

2. The method of claim 1, wherein said configuring step comprises switching two copies of a same hitless flow to a same one of the output ports of the destination nodes.

3. The method of claim 1, wherein the outputs ports of the destination nodes determine at least one of packet loss or path failure responsive to the correctness information.

4. The method of claim 3, wherein the respective link aggregation group that includes the packet loss is replaced by a same packet group received from the protecting path.

5. The method of claim 3, wherein the respective link aggregation group that includes the packet loss is determined by a timestamp or a sequence number indicated in modified ones of the marker packets, the modified ones of the marker packets being modified to include at least a portion of the correctness information.

* * * * *